Patented Dec. 7, 1937

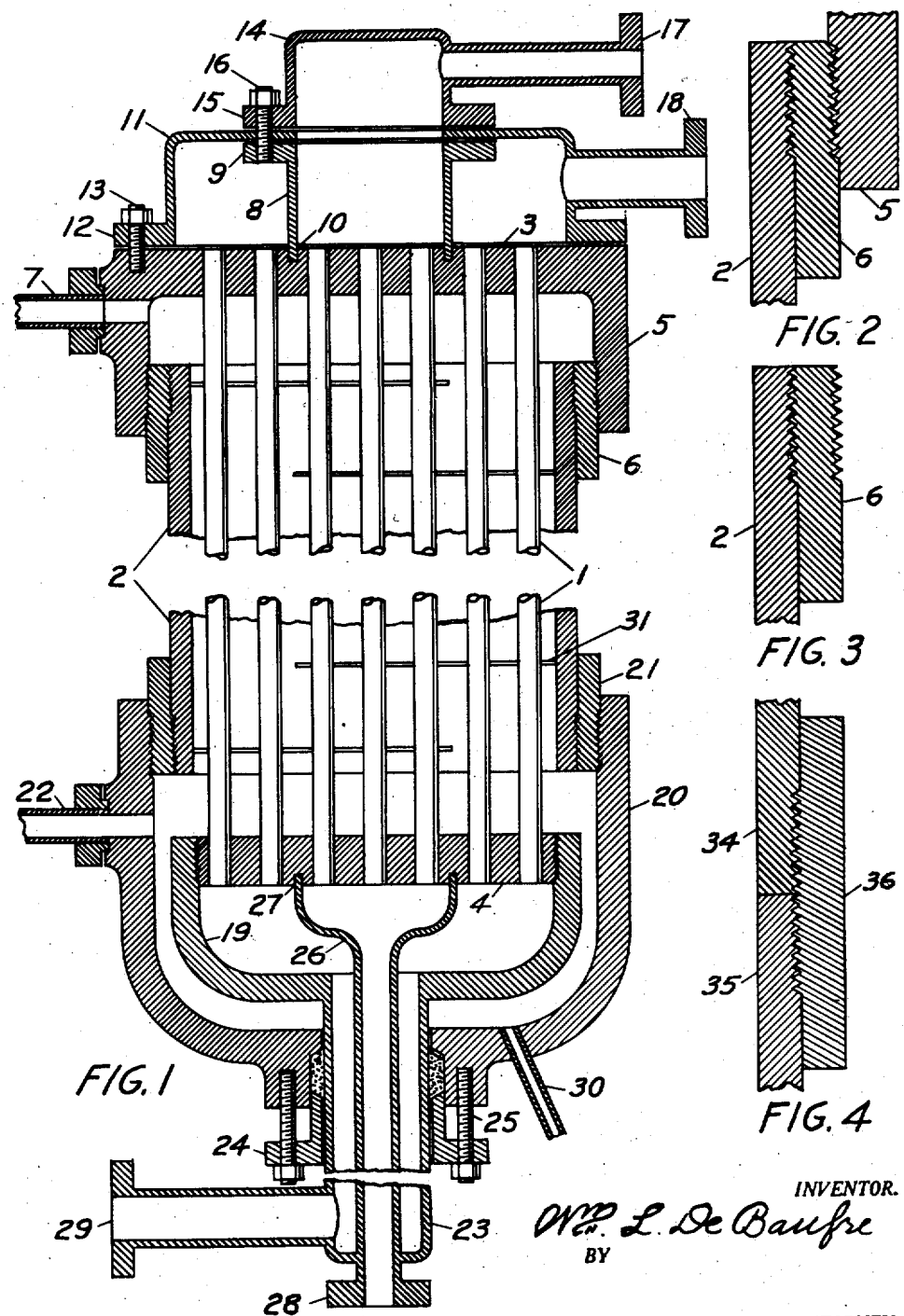

2,101,167

UNITED STATES PATENT OFFICE 2,101,167

METHOD OF MAKING AND ARRANGEMENT OF INTERCHANGER FOR HEAT EXCHANGE BETWEEN FLUIDS AT LOW TEMPERATURES

William Lane De Baufre, Lincoln, Nebr.

Application August 19, 1935, Serial No. 36,882

11 Claims. (Cl. 29—157.3)

This invention relates to improvements in the art of exchanging heat between fluids of different temperatures. It is particularly applicable to heat exchange between one fluid under high pressure and another fluid under low pressure where both fluids are at low temperatures, as is the case in plants for rectification of atmospheric air. The present application is a continuation in part of my former application filed on the 9th day of August, 1934, Serial No. 739,073, which matured into Patent No. 2,034,428, issued March 17, 1936.

The object of the invention is to make an interchanger gas tight with fused metal joints between shell and heads by soldering, brazing or welding, and at the same time to utilize the high tensile strength of a cold drawn bronze shell which is annealed and weakened by the heating necessary to make the fused metal joints.

The foregoing, together with such other advantages as may hereinafter appear or are incident to the invention, are realized by the construction illustrated in preferred form in the drawing, wherein Fig. 1 is an assembly view in cross section of the complete interchanger, Fig. 2 is an enlarged view of one of the fused metal joints between shell and head, Fig. 3 is a view of the partly assembled joint, and Fig. 4 shows the same construction applied to an interchanger where two or more lengths of tubing are required for the shell.

The interchanger shown in the drawing is intended for use in air separation plants as described in U. S. Patent No. 1,951,185, issued March 13, 1934. It is particularly suitable for high pressure throttle expansion plants as shown in Fig. 2 although it is also suitable for use in moderate pressure plants as shown in Fig. 1 of the above patent. In such air rectification plants, compressed air is cooled in an interchanger from about room temperature to one hundred degrees or more below zero centigrade by products of rectification, more or less pure oxygen and nitrogen, returning from the rectifier at very low temperatures.

For moderate air pressures in small plants, the shells of such interchangers have been made of copper to avoid corrosion. For very high air pressures and in large plants, however, the thickness of a copper shell would be excessive, resulting not only in high first cost but also in difficulties in construction and operation. Cooling down to operating temperatures and warming up for defrosting would be unduly retarded and wasteful of stored up refrigeration. A high tensile strength bronze would therefore be more desirable than copper because a thinner shell with less mass of metal could then be used.

The strength of such high tensile strength bronze, however, depends largely on cold working, such as occurs in drawing a tube for an interchanger shell. In assembling such interchangers, soldering, brazing or welding is necessary in order to secure gas tight joints of fused metal between shell and heads. The application of heat for this purpose anneals the cold worked metal in the shell, thereby reducing the strength of the hardened bronze to that of annealed material.

With one particular bronze, for example, the strength of the cold drawn metal is as high as 75,000 lb. per sq. in. while the strength of annealed metal may be as low as 50,000 lb. per sq. in. With a factor of safety of five, the thickness of a shell eight inches inside diameter to withstand 3,000 lb. per sq. in. would need to be 0.8 inch only if based on the strength of the cold drawn metal. But if the working stress must be based on the strength of the annealed metal, the thickness must be 1.2 inches. Thus, there would be 50 per cent more metal in the shell to be cooled down with greater loss of time at starting. The loss of stored up refrigeration would be correspondingly greater at stopping with a lengthening of the time for defrosting. The larger mass of metal would be more difficult to handle during construction. As the largest size shell which can be drawn is determined by the limiting size of ingot, the greater thickness of shell would in certain cases require it to be made in two pieces rather than in a single piece. Many advantages would thus result from basing the thickness of the shell upon the strength of the cold drawn bronze rather than upon that of the annealed metal.

During operation of air separation plants, the temperature of the interchanger is usually below atmospheric temperature; and even while defrosting, the temperature but slightly exceeds atmospheric temperature. In the normal running of such plants, therefore, temperatures are never reached that would anneal cold worked bronze. Advantage could therefore be taken of the high working stress permissible in cold worked bronze except for the fact that in securing a gas tight joint of fused metal between shell and heads, a portion of the shell is annealed and its strength reduced to that of annealed bronze.

In the interchanger described herein and shown on the drawing, an arrangement of interchanger and method of making it have been developed which permit fused metal joints to be obtained by soldering, brazing or welding, and which at the same time enable full advantage to be taken of the high working stress permissible in cold worked bronze.

The interchanger consists of a number of small straight tubes 1 within shell 2 and extending between tube sheet 3 at the upper end and tube sheet 4 at the lower end of the interchanger. Tube sheet 3 is part of a casting or forging 5 which has a larger internal diameter than the external diameter of shell 2. The gap between shell 2 and head 5 is filled by sleeve 6 which extends beyond head 5 over shell 2.

For mechanical strength of the joint between shell 2 and sleeve 6, shell 2 is threaded externally and sleeve 6 is threaded internally so that sleeve 6 can be screwed onto shell 2 and the sleeve held in place by interlocking of the threads. Sleeve 6, however, extends beyond the external threads on shell 2, and part way over the unthreaded portion of shell 2. The object of this construction is to fully reinforce the threaded portion of shell 2 and to extend this reinforcing a short distance beyond the threaded portion where the shell has not been weakened by cutting threads thereon. If the reinforcing sleeve were not extended beyond the threaded portion of the shell, the shell might fail by fatigue cracks starting from the roots of threads at and beyond the edge of the reinforcing sleeve due to concentration of stress at the roots of these threads. But by extending sleeve 6 beyond the threaded portion of shell 2, such concentration of stress is avoided by the reinforcing action of sleeve 6. For similar reasons, sleeve 6 is threaded externally and screwed into head 5 which is extended beyond the threaded portion of sleeve 6.

The joints between shell 2 and sleeve 6 and between sleeve 6 and head 5 are made gas tight by soldering, brazing, or welding, thus forming fused metal joints. The heating of the cold drawn metal shell 2 in order to solder, braze or weld the joint between shell 2 and sleeve 6, results in annealing a portion of shell 2 and thereby considerably reducing the strength of this portion below that corresponding to the cold drawn condition. The length of sleeve 6, however, is made such that the annealed portion of shell 2 is all reinforced by sleeve 6 which extends a sufficient distance from the end of shell 2 to cover entirely the portion of shell 2 which has been heated sufficiently by soldering, brazing or welding, to appreciably reduce the strength of the cold worked metal. In fact, sleeve 6 extends part way over the hardened portion of shell 2 in order to completely cover the annealed portion.

Also, when the joint between sleeve 6 and head 5 is made gas tight by soldering, brazing or welding, a portion of shell 2 in contact with the heated portion of sleeve 6 is also heated. This heating would result in annealing such portion of shell 2 if it were not already annealed. Sleeve 6, however, extends a sufficient distance beyond head 5 so that shell 2 is not annealed beyond sleeve 6. In fact, sleeve 6 extends part way over the hardened portion of shell 2 in order to entirely cover the portion of shell 2 annealed by soldering, brazing or welding head 5 to sleeve 6.

Sleeve 6 is thus extended a sufficient distance over shell 2 and beyond head 5 to prevent annealing shell 2 in making the two fused metal joints between shell 2 and sleeve 6 and between sleeve 6 and head 5. Sleeve 6 should preferably have a close fit over shell 2; but in any event, sleeve 6 will effectively reinforce shell 2 as soon as shell 2 has expanded by creep, or plastic flow, of the metal where its strength has been reduced by annealing in making the fused metal joints.

The lower ends of tubes 1 are affixed in tube sheet 4 which is made an integral part of floating head 19 by screwing and soldering it therein or by any other suitable construction. Due to the high gas pressure involved, the outside diameter of floating head 19 must be considerably greater than its inside diameter and may even be greater than the outside diameter of shell 2. Outer head 20 therefore has an inside diameter greater than the outside diameter of shell 2. The gap between shell 2 and outer head 20 is filled by sleeve 21. The proportions of sleeve 21 relative to shell 2 and to outer head 20 are made as described for sleeve 6 and head 5, and for the same reasons.

The construction described above and shown on the drawing, provides an enlarged space between the ends of shell 2 and sleeve 6 and the tube sheet 3 of head 5. This enlarged space has the advantages of the recess claimed in U. S. Patent No. 1,823,388 in reducing the danger of obstructing outlet pipe 7 by snow and ice in a gas liquefaction plant. The inside diameter of shell 2 is but slightly greater than the outside diameter of the bundle of tubes 1, as necessary for efficient heat transfer from the fluid flowing outside tubes 1 to the fluids flowing inside these tubes. In addition to the advantages previously described, the construction shown enables this recess to be formed with a head 5 of simple shape that may be easily machined and forged rather than cast, and thus have the high strength and nonporosity required for gases under high pressure.

The construction described above and shown on the drawing also provides a space of enlarged diameter for floating head 19 within head 20 below the ends of shell 2 and sleeve 21. Pipe 22 is connected to the enlarged space between the ends of shell 2 and sleeve 21 and floating head 19. Floating head 19 is permitted to move with any relative expansion of tubes 1 and shell 2 by reason of pipe 23 connected thereto and extending through the stuffing box shown in outer head 20.

The method of making an interchanger as described above and as shown on the drawing includes the following steps: A shell 2 of high tensile bronze is drawn cold to the proper thickness to safely withstand in the cold worked condition due to the drawing operation, the internal fluid pressure. This shell is threaded for a short distance at each end with a fine parallel thread. Cast or forged bronze heads 5 and 20 are made with an internal diameter greater than the external diameter of shell 2. Fine parallel threads are cut on the internal surface of each head, but these threads do not extend to the edge of the cylindrical surface, which for a short distance is smooth and of a diameter equal to or greater than the root diameter of the internal threads. Bronze sleeves 6 and 21 are made with an outside diameter equal to this diameter and with an internal diameter somewhat less than the outside diameter of shell 2. As shown in the enlarged view in Fig. 2, bronze sleeve 6 is threaded externally to fit head 5. It is threaded internally to fit shell 2 and bored out to extend over the shell beyond the threaded portion. Sleeve 21 is similarly machined to fit head 20 and shell 2.

If the joints between shell and sleeve and between sleeve and head are to be soldered, the threads are first "tinned." Sleeves 6 and 21 are then screwed over the ends of shell 2 into the positions as shown for sleeve 6 in Fig. 3.

The ends of shell 2 and of sleeves 6 and 21 are then heated to melt the solder on the threaded portions and thus form fused metal joints. If the joints are to be brazed, heat may be applied with the proper brazing metal. Or, the joint between sleeve and shell may be welded at the end of the shell. In any case, however, the lengths of sleeves 6 and 21 are made sufficient to prevent any appreciable heating and annealing of shell 2 beyond these sleeves. To prevent annealing shell 2 beyond sleeves 6 and 21, shell 2 may be kept cool by means of running water, moistened cloths, etc., applied beyond sleeves 6 and 21. Fused metal joints are thereby made between shell 2 and sleeves 6 and 21 without appreciably reducing the strength of shell 2 below that due to the cold worked condition except where reinforced by sleeves 6 and 21 which extend part way over the unannealed portion of shell 2.

Heads 5 and 20 are then screwed into place over sleeves 6 and 21 respectively, the sleeves projecting beyond heads 5 and 20 over shell 2 as shown on the drawing. If the joints between sleeves and heads are to be made gas tight by soldering, the threads on sleeves and heads are first "tinned" before assembling. Heads 5 and 20 are then heated to melt the solder and form fused metal joints. Or, the joints may be brazed or welded. In any case, sleeves 6 and 21 project sufficiently beyond heads 5 and 20 to prevent appreciable heating of shell 2 beyond the sleeves. Shell 2 may be kept cool by running water or moistened cloths applied beyond sleeves 6 and 21 whereby shell 2 will not be heated to a temperature which would appreciably anneal it except where it is reinforced by sleeves 6 and 21 which extend part way over the unannealed portion of shell 2.

For shells of large diameter where the limiting size of bronze ingots renders it impractical to obtain a single drawn tube of sufficient length, two or more tubes may be joined lengthwise in a single interchanger. The joints between such tubes may be made by the same method and with the same construction as described for gas tight joints between the shell and heads, retaining at the same time the high tensile strength of the cold drawn tubes except where the strength is augmented by a reinforcing sleeve. The similarity of the construction is shown by Fig. 4 for such a joint between two lengths of tubing. To make the fused metal joint, sleeve 36 is heated near the middle while the ends are kept cool, thereby preventing any heating and annealing of shells 34 and 35 beyond sleeve 36.

In air separation plants operating with throttle expansion of the compressed air from a pressure of 1,000 to 3,000 lb. per sq. in. in order to obtain the necessary refrigeration, interchangers of the straight tube type have not heretofore been used with the shells subjected to this very high compressed air pressure for the reason that such shells would be excessively thick and heavy with consequent disadvantages in construction and operation as explained previously. It has been customary to use small coiled tubes within a thin shell to cool the highly compressed air from atmospheric temperature to a very low temperature. The high pressure air flowed through the coiled tube or tubes of small diameter which could safely withstand the high pressure air with a thin wall by reason of the small diameter of the tubes.

This arrangement, however, does not work out very satisfactorily by reason of the fact that the compressed air should be cooled by heat interchange with two returning fluids, namely, more or less pure oxygen and nitrogen resulting from separation of the cooled air within a rectifier. If one of these fluids, say the nitrogen, is returned within the shell of the interchanger surrounding the coiled compressed air tube or tubes, it is necessary to return the other fluid, oxygen, within coiled tubes in the shell in order to keep it separated from the nitrogen.

While only a thin shell is required for the low pressure nitrogen, this arrangement is poor from a heat interchange standpoint. Thus, the heat to raise the temperature of the returning oxygen must be transferred first from the compressed air to the returning nitrogen and then from the returning nitrogen to the oxygen. This double heat transfer results in a greater temperature difference than would be the case with a single heat transfer, thereby increasing the power necessary to operate the process in accordance with the second law of thermodynamics and increasing the warm end loss in the refrigeration carried out of the system by the returning oxygen.

A much better arrangement would be to cool the compressed air while flowing through the shell of the interchanger by heat interchange with returning oxygen and nitrogen flowing therough two groups of tubes therein as in the interchanger described in the present specification. This arrangement would also be less liable to be clogged by frost deposited from the air while being cooled. This preferred arrangement of interchanger has not heretofore been used by reason of the very thick, heavy and expensive shell of copper that would be required, to safely withstand the highly compressed air pressure. While some of the cold drawn bronzes have sufficient tensile strength to permit a shell of moderate thickness to be used in the cold worked condition, the heating necessary to make gas tight fused metal joints between shell and heads by soldering, brazing or welding, would anneal such shells and reduce their tensile strength to a low value. The method and arrangement herein proposed enable gas tight fused metal joints to be made and at the same time retain the strength of cold drawn metal in the shells.

I claim:

1. A method of making an interchanger with a cold worked metal shell for heat exchange between fluids at temperatures below the annealing temperature of said shell, which includes selecting a shell having a thickness sufficient to safely withstand in the cold worked condition the pressure of one of said fluids, placing a reinforcing sleeve around said shell at the end thereof, heating the end of said shell and said sleeve to form a fused metal joint between them while maintaining the shell beyond said sleeve at a temperature sufficiently low to prevent any substantial lowering of the tensile strength of said shell beyond said sleeve, placing a head around said sleeve with said sleeve projecting beyond said head and over said shell, heating said head and said sleeve to form a fused metal joint between them while maintaining the shell beyond said sleeve at a temperature sufficiently low to prevent any substantial lowering of the tensile strength of said shell beyond said sleeve.

2. A method of making an interchanger with a cold worked metal shell for heat exchange between fluids at temperatures below the annealing temperature of said shell, which includes selecting a shell having a thickness sufficient to safely withstand in the cold worked condition the pressure of one of said fluids, selecting a metal head having an internal diameter greater than the external diameter of said shell, placing a reinforcing sleeve around said shell near the end thereof, placing said head around said sleeve with said sleeve projecting beyond said head and over said shell, heating said head and said sleeve to form a fused metal joint between them, and maintaining the shell beyond said sleeve at a temperature sufficiently low to prevent any substantial lowering of the tensile strength of said shell beyond said sleeve.

3. A method of making an interchanger with a cold worked metal shell for heat exchange between fluids at temperatures below the annealing temperature of said shell, which includes selecting a shell having a thickness sufficient to safely withstand in the cold worked condition the pressure of one of said fluids, selecting a metal head having an internal diameter greater than the external diameter of said shell, placing a reinforcing sleeve around said shell, placing said head around said sleeve with said sleeve projecting beyond said head and over said shell, heating said head and said sleeve to form a fused metal joint between them, said sleeve being made of such length that the end thereof and said shell beyond said sleeve is maintained at a temperature sufficiently low to prevent any substantial lowering of the tensile strength of said shell beyond said sleeve.

4. An interchanger for heat exchange between fluids at low temperatures including a cold worked metal shell which is not annealed at the temperatures of said fluids, a head having an internal diameter greater than the external diameter of said shell, a sleeve surrounding said shell and filling the gap between said shell and said head, fused metal joints between said shell and said sleeve and between said sleeve and said head in the making of which joints a portion of the cold worked metal shell is heated and annealed, the said reinforcing sleeve extending beyond the annealed portion and part way over the hardened portion of said shell whereby the strength of the shell is augmented wherever it is reduced by annealing in making the fused metal joints.

5. An interchanger as in claim 4 wherein said sleeve is held in place within said head by external threads on said sleeve interlocking with internal threads on said head.

6. An interchanger as in claim 4 wherein said sleeve is held in place within said head by external threads on said sleeve interlocking with internal threads on said head, and said head extends over said sleeve beyond said external threads.

7. An interchanger as in claim 4 wherein said sleeve is held in place within said head by external threads on said sleeve interlocking with internal threads on said head and wherein said shell is held in place within said sleeve by external threads on said shell interlocking with internal threads on said sleeve.

8. An interchanger as in claim 4 wherein said shell is held in place within said sleeve by external threads on said shell interlocking with internal threads on said sleeve, and said sleeve extends over said shell beyond said external threads.

9. An interchanger as in claim 4 which includes an enlarged space formed by said head and the ends of said shell and said sleeve, and an outlet pipe connecting with said enlarged space.

10. An interchanger as in claim 4 including a head with tube sheet fastened at one end of said shell, tubes affixed at one end in said tube sheet and extending through said shell, and a floating head with tube sheet into which the other end of said tubes is affixed, said floating head having an outside diameter greater than the inside diameter of said shell and being mounted in the enlarged space within said head.

11. An interchanger for heat exchange between fluids at low temperatures as in claim 9 wherein said cold worked metal shell is in two parts, a reinforcing sleeve extending over adjacent ends of the two parts of said shell, fused metal joints between said sleeve and the two parts of said shell in the making of which joints the adjacent ends of the two parts of said shell are heated and annealed, and said reinforcing sleeve extends beyond the annealed portions and part way over the hardened portions of the two parts of said shell whereby the strength of the shell is augmented wherever it is reduced by annealing in making the fused metal joints.

WILLIAM LANE DE BAUFRE.

---

CERTIFICATE OF CORRECTION.

Patent No. 2,101,167.     December 7, 1937.

WILLIAM LANE DE BAUFRE.

It is hereby certified that error appears in the printed specification of the above numbered patent requiring correction as follows: Page 4, second column, line 37, claim 11, for the claim reference numeral "9" read 4; and that the said Letters Patent should be read with this correction therein that the same may conform to the record of the case in the Patent Office.

Signed and sealed this 28th day of June, A. D. 1938.

(Seal)                      Henry Van Arsdale,
Acting Commissioner of Patents.

ing a shell having a thickness sufficient to safely withstand in the cold worked condition the pressure of one of said fluids, selecting a metal head having an internal diameter greater than the external diameter of said shell, placing a reinforcing sleeve around said shell near the end thereof, placing said head around said sleeve with said sleeve projecting beyond said head and over said shell, heating said head and said sleeve to form a fused metal joint between them, and maintaining the shell beyond said sleeve at a temperature sufficiently low to prevent any substantial lowering of the tensile strength of said shell beyond said sleeve.

3. A method of making an interchanger with a cold worked metal shell for heat exchange between fluids at temperatures below the annealing temperature of said shell, which includes selecting a shell having a thickness sufficient to safely withstand in the cold worked condition the pressure of one of said fluids, selecting a metal head having an internal diameter greater than the external diameter of said shell, placing a reinforcing sleeve around said shell, placing said head around said sleeve with said sleeve projecting beyond said head and over said shell, heating said head and said sleeve to form a fused metal joint between them, said sleeve being made of such length that the end thereof and said shell beyond said sleeve is maintained at a temperature sufficiently low to prevent any substantial lowering of the tensile strength of said shell beyond said sleeve.

4. An interchanger for heat exchange between fluids at low temperatures including a cold worked metal shell which is not annealed at the temperatures of said fluids, a head having an internal diameter greater than the external diameter of said shell, a sleeve surrounding said shell and filling the gap between said shell and said head, fused metal joints between said shell and said sleeve and between said sleeve and said head in the making of which joints a portion of the cold worked metal shell is heated and annealed, the said reinforcing sleeve extending beyond the annealed portion and part way over the hardened portion of said shell whereby the strength of the shell is augmented wherever it is reduced by annealing in making the fused metal joints.

5. An interchanger as in claim 4 wherein said sleeve is held in place within said head by external threads on said sleeve interlocking with internal threads on said head.

6. An interchanger as in claim 4 wherein said sleeve is held in place within said head by external threads on said sleeve interlocking with internal threads on said head, and said head extends over said sleeve beyond said external threads.

7. An interchanger as in claim 4 wherein said sleeve is held in place within said head by external threads on said sleeve interlocking with internal threads on said head and wherein said shell is held in place within said sleeve by external threads on said shell interlocking with internal threads on said sleeve.

8. An interchanger as in claim 4 wherein said shell is held in place within said sleeve by external threads on said shell interlocking with internal threads on said sleeve, and said sleeve extends over said shell beyond said external threads.

9. An interchanger as in claim 4 which includes an enlarged space formed by said head and the ends of said shell and said sleeve, and an outlet pipe connecting with said enlarged space.

10. An interchanger as in claim 4 including a head with tube sheet fastened at one end of said shell, tubes affixed at one end in said tube sheet and extending through said shell, and a floating head with tube sheet into which the other end of said tubes is affixed, said floating head having an outside diameter greater than the inside diameter of said shell and being mounted in the enlarged space within said head.

11. An interchanger for heat exchange between fluids at low temperatures as in claim 9 wherein said cold worked metal shell is in two parts, a reinforcing sleeve extending over adjacent ends of the two parts of said shell, fused metal joints between said sleeve and the two parts of said shell in the making of which joints the adjacent ends of the two parts of said shell are heated and annealed, and said reinforcing sleeve extends beyond the annealed portions and part way over the hardened portions of the two parts of said shell whereby the strength of the shell is augmented wherever it is reduced by annealing in making the fused metal joints.

WILLIAM LANE DE BAUFRE.

CERTIFICATE OF CORRECTION.

Patent No. 2,101,167.             December 7, 1937.

WILLIAM LANE DE BAUFRE.

It is hereby certified that error appears in the printed specification of the above numbered patent requiring correction as follows: Page 4, second column, line 37, claim 11, for the claim reference numeral "9" read 4; and that the said Letters Patent should be read with this correction therein that the same may conform to the record of the case in the Patent Office.

Signed and sealed this 28th day of June, A. D. 1938.

(Seal)                               Henry Van Arsdale,
Acting Commissioner of Patents.

CERTIFICATE OF CORRECTION.

Patent No. 2,101,167. December 7, 1937.

WILLIAM LANE DE BAUFRE.

It is hereby certified that error appears in the printed specification of the above numbered patent requiring correction as follows: Page 4, second column, line 37, claim 11, for the claim reference numeral "9" read 4; and that the said Letters Patent should be read with this correction therein that the same may conform to the record of the case in the Patent Office.

Signed and sealed this 28th day of June, A. D. 1938.

(Seal)

Henry Van Arsdale,
Acting Commissioner of Patents.